United States Patent
Fiabane et al.

(10) Patent No.: US 10,507,464 B2
(45) Date of Patent: Dec. 17, 2019

(54) MICROFLUIDIC DEVICE

(71) Applicant: Blacktrace Holdings Limited, Royston, Hertfordshire (GB)

(72) Inventors: Joe Fiabane, Somersham (GB); Tim Atkins, Royston (GB)

(73) Assignee: Blacktrace Holdings Limited, Royston, Hertfordshire (GB)

( * ) Notice: Subject to any disclaimer, the term of this patent is extended or adjusted under 35 U.S.C. 154(b) by 246 days.

(21) Appl. No.: 15/788,404

(22) Filed: Oct. 19, 2017

(65) Prior Publication Data
US 2018/0111122 A1   Apr. 26, 2018

(30) Foreign Application Priority Data
Oct. 21, 2016   (GB) ..................................... 1617869

(51) Int. Cl.
| | |
|---|---|
| *B01L 3/00* | (2006.01) |
| *F16K 99/00* | (2006.01) |
| *B01F 13/00* | (2006.01) |
| *B01F 3/08* | (2006.01) |

(52) U.S. Cl.
CPC ...... *B01L 3/502715* (2013.01); *B01F 3/0807* (2013.01); *B01F 13/0062* (2013.01);
(Continued)

(58) Field of Classification Search
CPC ......... B01L 3/502738; B01L 3/502715; B01L 2400/0638; B01L 2400/086;
(Continued)

(56) References Cited

U.S. PATENT DOCUMENTS

| | | |
|---|---|---|
| 5,637,469 A | 6/1997 | Wilding et al. |
| 2004/0115094 A1* | 6/2004 | Gumbrecht ....... B01L 3/502715 422/400 |

(Continued)

FOREIGN PATENT DOCUMENTS

| | | |
|---|---|---|
| EP | 2 743 692 A2 | 6/2014 |
| WO | WO 02/12734 A1 | 2/2002 |

(Continued)

OTHER PUBLICATIONS

Churski et al., "Droplet on demand system utilizing a computer controlled microvalve integrated into a stiff polymeric microfluidic device", *Lab on a Chip*, vol. 10, Dec. 1, 2009, pp. 512-518.
(Continued)

*Primary Examiner* — Christopher Adam Hixson
(74) *Attorney, Agent, or Firm* — Myers Bigel, P.A.

(57) ABSTRACT

A microfluidic device includes a block having at least one reservoir, a base layer attached to the bottom of the block and a microfluidic channel formed in the base layer or at the interface between the block and base layer. The microfluidic channel is in fluid communication with the at least one reservoir. A static pressure source is operatively coupleable to the reservoir. A flow path extends from the reservoir to the microfluidic channel. The flow path has a first portion which extends upwardly away from the base layer over a barrier and into a second portion which extends downwardly towards the base layer and leads to the microfluidic channel. The flow path is configured such that it prevents flow from the reservoir to the microfluidic channel under the influence of gravity alone when the reservoir is filled to a level below the level of the top of the barrier.

13 Claims, 6 Drawing Sheets (52) U.S. Cl.
CPC ... *B01L 3/502738* (2013.01); *B01L 3/502746* (2013.01); *B01L 3/502784* (2013.01); *F16K 99/0021* (2013.01); *B01L 2200/0621* (2013.01); *B01L 2200/0689* (2013.01); *B01L 2200/12* (2013.01); *B01L 2200/141* (2013.01); *B01L 2300/0816* (2013.01); *B01L 2300/0867* (2013.01); *B01L 2300/0874* (2013.01); *B01L 2300/0887* (2013.01); *B01L 2300/14* (2013.01); *B01L 2400/0487* (2013.01); *B01L 2400/06* (2013.01); *F16K 2099/0084* (2013.01)

(58) Field of Classification Search
CPC ......... B01L 2400/0457; B01L 2400/06; B01L 2400/0683; B01L 2400/0688; F16K 99/0026; F16K 99/0021; F16K 2099/0084
See application file for complete search history.

(56) References Cited

U.S. PATENT DOCUMENTS

| | | | |
|---|---|---|---|
| 2008/0031787 | A1* | 2/2008 | Yu ..................... B01L 3/502753 422/504 |
| 2009/0023201 | A1 | 1/2009 | Hongo et al. |
| 2012/0214254 | A1* | 8/2012 | Schmidt .............. B01L 3/50273 436/174 |
| 2015/0251182 | A1 | 9/2015 | Kurowski et al. |
| 2015/0292988 | A1 | 10/2015 | Bharadwaj et al. |
| 2016/0130640 | A1 | 5/2016 | Wright et al. |
| 2017/0291174 | A1* | 10/2017 | Makarewicz, Jr. .......................... B01L 3/502784 |

FOREIGN PATENT DOCUMENTS

| | | |
|---|---|---|
| WO | WO 2010/102335 A1 | 9/2010 |
| WO | WO 2014/086956 A2 | 6/2014 |

OTHER PUBLICATIONS

Patents Act 1977: Search Report under Section 17(5), UK IPO Application No. GB1617869.1, dated Mar. 31, 2017, 4 pp.

Communication with European Search Report, EP Application No. 17197173.2, dated Feb. 2, 2018, 5 pp.

* cited by examiner

MICROFLUIDIC DEVICE

RELATED APPLICATION

This application claims priority from Great Britain Patent Application No. 1617869.1, filed on Oct. 21, 2016, the disclosure of which is hereby incorporated herein by reference in its entirety.

FIELD OF THE INVENTION

The present invention relates to a microfluidic device.

BACKGROUND

Microfluidic devices are well known for generating droplets. The droplets are aqueous compartments which are formed by combining aqueous and oil flows in a microfluidic device. Either the aqueous or the oil flow will form the droplets while the other flow forms the continuous phase. The liquids which are used in the microfluidic device are typically stored away from the microfluidic chip and are typically connected to the chip via a tube. The liquid is pushed from the reservoir to the chip along the tube either using gas pressure, or using a syringe. However, connections between a tube and a chip with microchannels can be problematic. This is because connections typically have changes in the flow path cross-section and un-swept volumes where particles can get trapped. It is therefore preferable to locate the reservoirs in the microfluidic device itself. This eliminates the above-mentioned connections and also allows the channel geometries between the reservoir and microfluidic channel to be optimised to reduce sedimentation which might otherwise occur, for example, in cell and bead suspensions.

Another advantage of integrating the fluid reservoirs into the microfluidic device is that all of the fluids are contained in a single component which can be disposed easily. This is important for many biological applications where avoiding cross-contamination between samples is a key requirement.

One way to achieve such an integrated microfluidic device is to provide a block comprising at least one reservoir and a base layer beneath the block to form the bottom of the reservoir. Microchannels can then be formed in the bottom of the block and/or the top of the base layer of the outer face between the block and base layer, the channels being in fluid communication with the reservoirs.

The liquid can then flow under gravity from the reservoir into the microfluidic channel below.

However, this can give rise to a problem as explained with reference to FIGS. 1A to 1D. These figures are all schematic plan views of the microfluidic channel 1. The microfluidic channel comprises two aqueous channels 2 for aqueous solution 8 which converge at a junction 3. A first aqueous solution typically containing cells will be fed along one channel while RNA capture beads with a lysis buffer be fed along the second channels. A pair of oil channels 4 feed oil to a second junction 5 downstream of the first junction 5 and an emulsion is formed at outlet channel 6 as best shown in FIG. 1C which shows oil 7 as the continuous phase with the droplets of the aqueous solution 8. The reservoirs which supply the aqueous solution 8 and oil 7 are provided in a block which is above the plane of the paper shown in FIGS. 1A to 1D such that these flow into the channels under gravity.

Figure 1A:
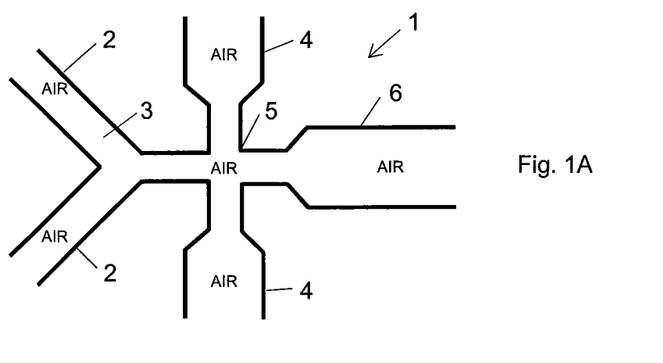
FIGS. 1A to 1D are schematic plan views of a portion of the microchannel illustrating the problem addressed by the present invention.
Figure 1B:
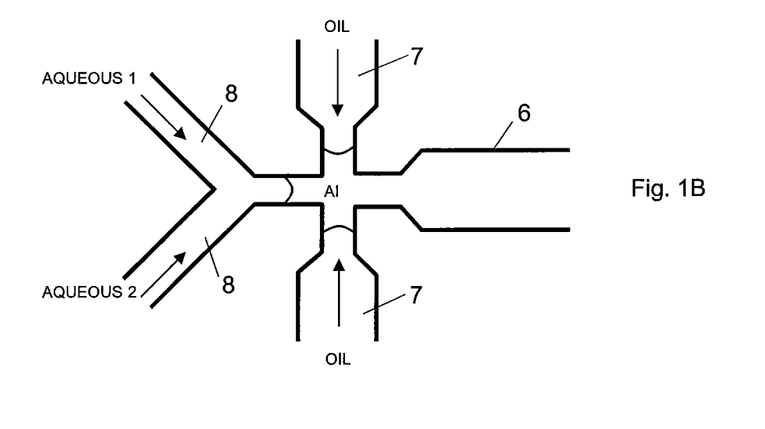
Figure 1C:
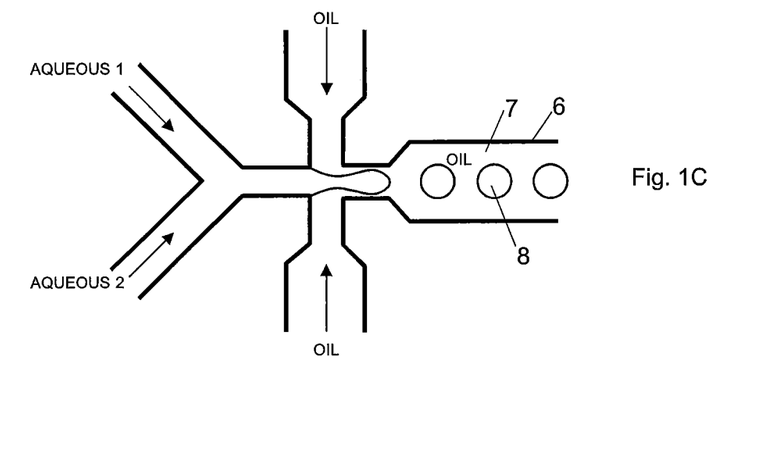

FIG. 1A shows the initial state of the microfluidic channel before any fluids have flowed into the channel 1. In this state, all of the channels are filled with air. The channel is ideally primed as shown in FIG. 1B with the aqueous solutions 8 and oil 7 having displaced most of the air out through the outlet channel 6.

Figure 1D:
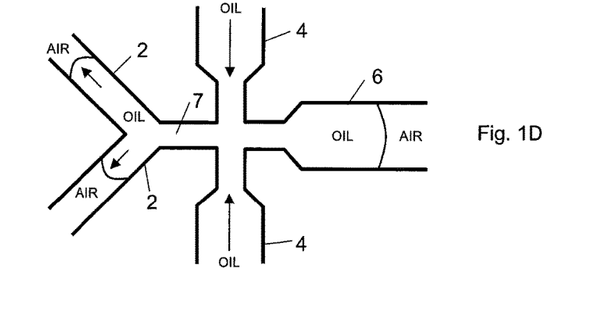

If, however, the oil 7 reaches the junction 5 for the aqueous solutions 8, oil will typically flow into the aqueous channels 2 as shown in FIG. 1D.

If the aqueous solutions 8 have been dispensed into the channels 2 then the oil 7 will not flow very far into the aqueous channels 2 as the air in these channels will be trapped and will get compressed and resist the flow of the oil 7. When the flow of the aqueous solutions 8 is initiated then the air and the aqueous solutions 8 will push most of this oil out, however the oil can get stuck to the inside surfaces of these channels. If oil droplets do get stuck then they will affect the hydraulic resistance of the channels which in turn will affect the flow rate of the aqueous phase and affect the quality of the droplets produced.

If the aqueous solutions 8 have not been dispensed into the aqueous channels 2 then the oil 7 can potentially flow all the way up the aqueous channels 2 and into the aqueous reservoirs. This would cause significant problems when trying to run an aqueous sample. The only way to clear the oil out of the microfluidic channel 1 is to pump the aqueous solutions 8 through the channel 1. While this 'purging' process is occurring the quality of any droplets produced is likely to be poor. This results in loss of sample and potential corruption of the emulsion that is collected in the output reservoir.

One way of addressing this problem is to provide a capillary valve as disclosed, for example, in "Droplet on demand system utilizing a computer controlled microvalve integrated into a stiff polymeric microfluidic device; Krzysztof Churski, Jacek Michalski and Piotr Garstecki; Received Jul. 24, 2009, Accepted Oct. 28, 2009; First published as an Advance Article on the web Dec. 1, 2009; DOI: 10.1039/b915155a". This is a channel with a series of wider regions which are sufficiently wide that the capillary force can no longer draw the liquid through this region. Whilst this works with aqueous solutions, it is not effective for oil based liquids.

SUMMARY

The present invention therefore aims to solve the above problem in a manner which is suitable for liquids of all types.

According to the present invention there is provided a microfluidic device according to claim 1.

The present invention provides a device with reservoirs in the same component as the microfluidic channel. The presence of a flow path which initially requires upward flow from the reservoir over a barrier as claimed means that the liquid in the reservoir cannot flood the microchannel as the reservoir is filled. When the microfluidic channel is to be primed, the application of pressure from the static pressure source to the reservoir forces the liquid up the first portion of the flow path over the barrier and down the second portion of the flow path to the microfluidic channel. The present invention therefore effectively allows the supply of the liquid to the microfluidic channel to be separated from the filling of the reservoir. This means that the liquid can be supplied to the microfluidic channel in a controlled manner as shown in FIG. 1B.

The filling of the reservoir is generally a manual process which is done by a user with a pipette. The force with which the liquid is applied by the pipette can cause new liquid to be pushed through the flow path and into the microfluidic channel. Therefore, preferably, the block further comprises at least one projection which forms a tortuous path from the reservoir to the flow path. This should ensure that any undue force on the liquid provided by the pipette simply creates turbulence within the reservoir, rather than forcing the liquid along the flow channel.

Preferably, one of the projections is an upwardly extending projection which extends away from the base layer. This enhances the above-mentioned tortuous path.

The block may be made using a number of techniques. However, in order to achieve the relatively complex geometry required for sufficient precision, the block is preferably injection moulded.

The microfluidic channel may be formed as a groove in the base layer with the block forming the upper surface of the microfluidic channel. Alternatively, the microfluidic channel may be formed as a bore in the base layer access to which is via ports from the top surface of the base layer. However, preferably, the microfluidic channel is formed in a groove in the bottom of the block, the microfluidic channel being closed by a top surface of the base layer. The advantage of providing the grooves in the bottom of the block is that the base layer can be fairly thin (approximately 100 μm) which helps with the bonding process.

The lower face of the flow path is preferably formed by a top surface of the base layer. Because the lower face of the flow path is closed off by the base layer, this simplifies the shape of the block thereby making it easier to manufacture, for example by bonding. If the flow channel were formed entirely within the block, it would be necessary to form a lateral channel at the bottom of the reservoir which would require a more complex manufacturing process.

The flow path may be formed entirely by the block and the base layer. However, preferably, the top of the flow path is at least partially formed by a gasket which seals the top of the block.

The reservoir may be formed as a separate component which is simply attachable to the block with the reservoir having an outlet port at its lowermost surface which mates and seals with a corresponding inlet in the block. However, preferably, the reservoir is formed as a bore in the block. This provides for a simple construction and eliminates the need for a seal between a separate reservoir and the block.

The flow path should be of a size which will prevent capillary flow into the microfluidic channel. Preferably, therefore, the flow path has a minimum diameter for at least a portion of its length of at least 1 mm. Just having part of the tube having such a relatively wide section will prevent capillary flow into the microfluidic channel. Preferably the channel has a minimum diameter of at least 1 mm for its whole length as this also reduces the flow resistance when flow is desired.

The microfluidic device is suitable for any liquid as it relies on a gravity effect rather than a capillary effect to prevent unwanted flow. Therefore, preferably, the reservoir contains an oil-based liquid. Such a liquid is not one which can be used with a capillary valve, as with plastic devices the channels have a naturally hydrophobic surface which is readily wetted by oil and as a result capillary valves do not work well.

In the broadest sense, the block may contain a single reservoir. However, preferably, the block comprises a plurality of reservoirs at least one of which has the flow path and at least one of which has an outlet at the bottom to the base layer. Thus, the reservoir with the flow path can be used for any liquid (such as an oil-based liquid) where the problem addressed by the present invention above arises, while reservoirs with an outlet at the bottom can be used for liquids where this does not arise.

Preferably a magnetic stirrer is suspended in at least one reservoir, the magnetic stirrer terminating above the bottom of the reservoir. The magnetic stirrer arranged in this way is advantageous as the reservoir can hold and stir a cell/bead suspensions with minimal damage to any cells/beads located therein. Integrating this functionality into the device is also beneficial in avoiding the above-mentioned problem with tubes.

There is preferably a manifold block above the block, via which the static pressure is applied to the reservoir. Such a manifold block can provide additional functionality, such as containing magnets for rotating the magnetic stirrers.

BRIEF DESCRIPTION OF THE DRAWINGS

Examples of microfluidic devices will now be described with reference to the accompanying drawings, in which.

DETAILED DESCRIPTION

Figure 3:
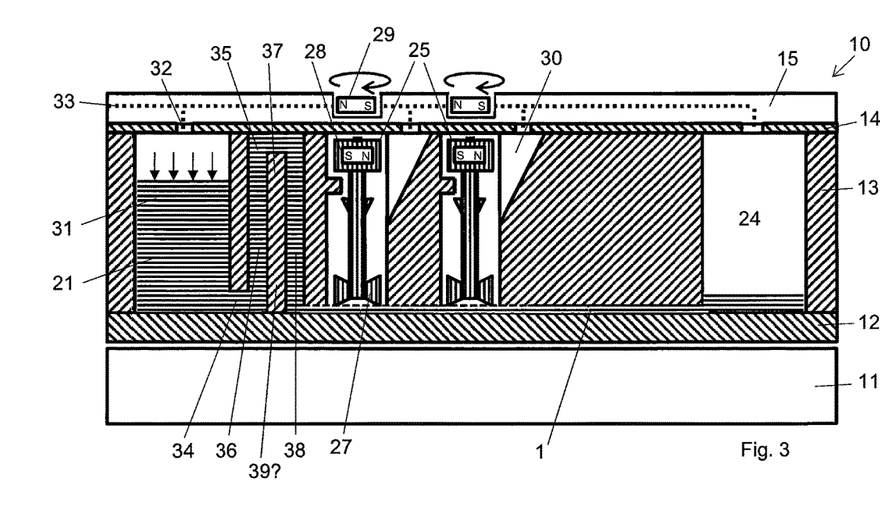
FIG. 3 is a view similar to FIG. 2 showing the complete microfluidic device in an operational state.

The microfluidic device 10 comprises a number of main components as best shown in FIG. 3. The device is supported on an instrument interface 11 including all necessary information including temperature control, a user interface and optical access. The device 10 comprises a base layer 12 which has a number of microchannels 1 formed on its upper surface as described below. Bonded to this is a block 13 which accommodates the reservoirs. The microchannels 1 may alternatively or additionally be provided in the bottom of the block 13. The top of the block is sealed by a gasket 14 and sandwiched between the block 13 and a manifold block 15 via which pressure can be applied to the reservoirs.

In this example, there is a single oil reservoir 20 containing an oil-based liquid 21 and a pair of aqueous reservoirs 22, 23 which, in this example, contain a cell suspension and a bead suspension respectively. The oil is fed along the oil channels 4 and the aqueous solutions are fed along the aqueous channels 2 which meet and combine at junction 5 as discussed above in relation to FIGS. 1A to 1D. This forms an emulsion in outlet line 6 which is fed to outlet reservoir 24.

Within the aqueous reservoirs 22, 23 are magnetic stirrers 25 which are suspended on a ledge 26 and are held with their impellers 27 above the bottom of the reservoir. A magnet 28 at the top of each stirrer 25 interacts with a magnet 29 in the manifold block 15 so as to rotate the magnetic stirrers 25. Each of the reservoirs 22, 23 is provided with an inclined portion 30 to allow the reservoirs to be readily filled.

The oil reservoir 20 comprises a main chamber 31 at the top of which is an opening 32 which leads to a pressure line 33. The pressure line 33 is connected to a pneumatic pump to allow the reservoir 20 to be pressurised. Similar lines lead from the manifold block 15 via openings in the gasket 14 to the other reservoirs 22, 23 and 24.

Figure 4:
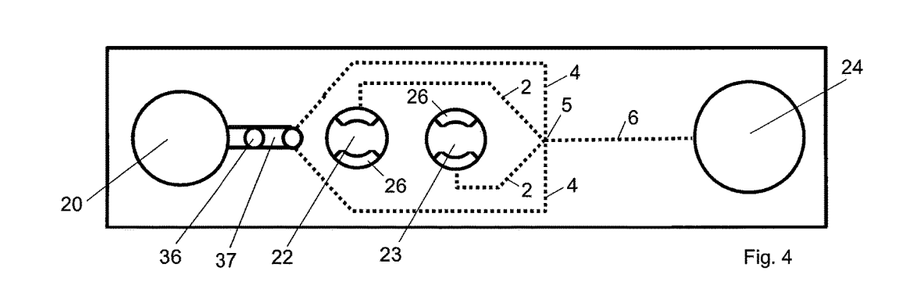
FIG. 4 is a schematic plan view of the microfluidic device of FIGS. 2 and 3.

The chamber 31 has an outlet 34 at the bottom which leads into flow path 35. It should be noted that the lower surface of the chamber 31 is formed by the base layer 12. This is a portion of the base layer 12 which does not contain a microfluidic channel. The microfluidic channel 1 is shown in dotted lines in FIG. 4 from which it is apparent that access to the microfluidic channel 1 is downstream of the flow path 35. The flow path 35 has an upwardly extending portion 36 which leads over a barrier 37 into a downwardly extending portion 38 which communicates with the microfluidic channel 1. This provides an inverted U-shape channel 37. The barrier partition 37 extends to a height which is above the normal maximum fill level of the oil 21 in the chamber 20.

Figure 5:
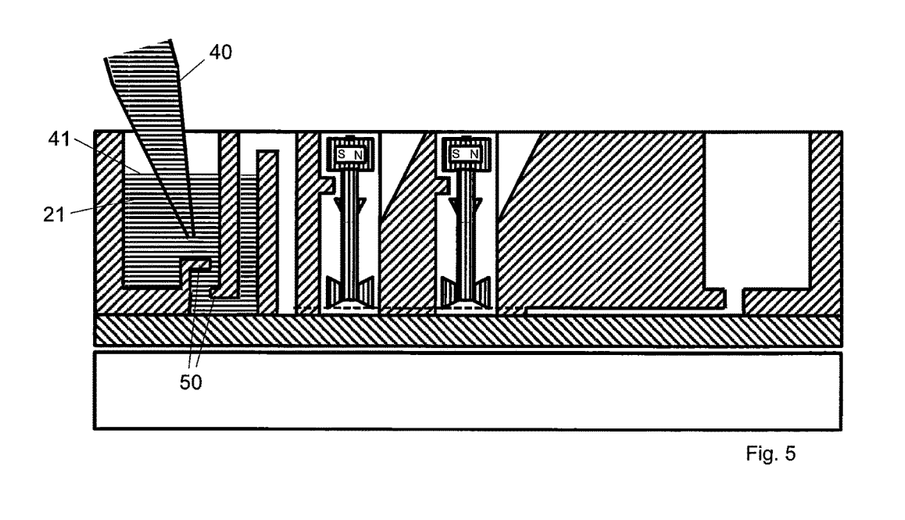
FIG. 5 is a view similar to FIG. 2 showing a second microfluidic device with an alternative reservoir construction.
Figure 6:
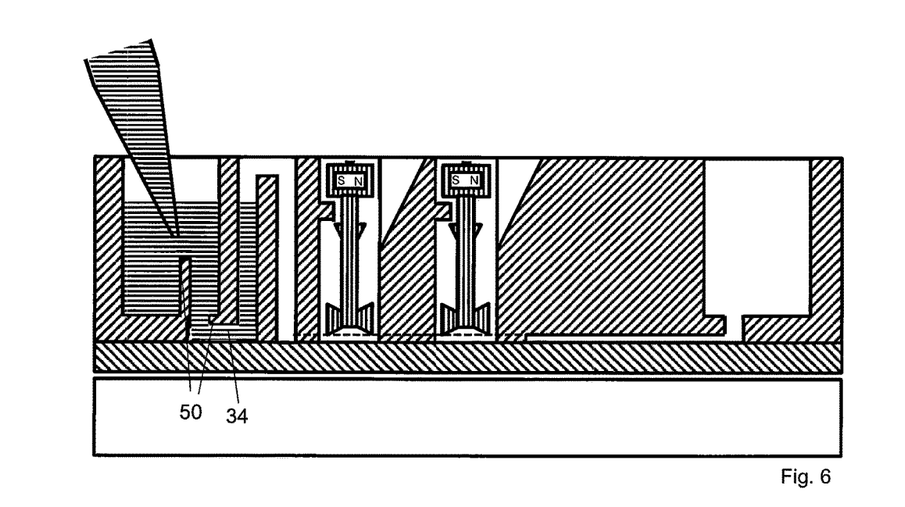
FIG. 6 is a view similar to FIG. 2 showing a third microfluidic device with a further alternative reservoir construction.

Before the manifold block 15 and gasket 14 are in place, the oil reservoir 20 is filled via a pipette 40 as shown in FIGS. 5 and 6. As can be seen in FIGS. 5 and 6, additional features 50 are formed as projections into the reservoir 20 to form a tortuous path between the reservoir 20 and the flow path 35. If a user applies undue pressure to the pipette such that the oil 21 is ejected at a relatively high velocity, these features 50 will impede the jetting of this liquid over the barrier 37.

Once all of the reservoirs are filled, gasket 14 and manifold block 15 are put in place, the controller in the instrument interface 11 applies the pressure along line 33 to the oil and aqueous reservoirs 21, 22, 23 at different times and with slightly different pressure levels. By controlling the timing of the pressure application and the pressure levels, it is possible to ensure that the two liquids arrive at the droplet junction 5 at approximately the same time as shown in FIG. 1B.

Figure 7:
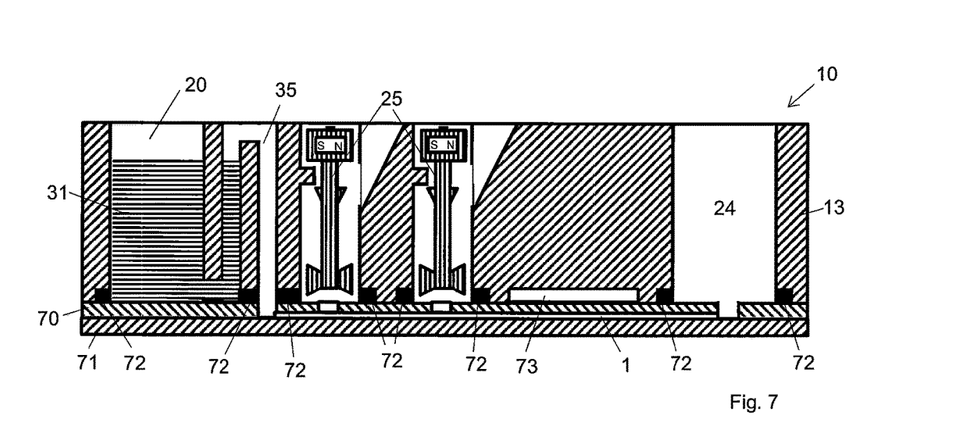
FIG. 7 is a view similar to FIG. 2 showing a fourth microfluidic device.

FIG. 7 shows an alternative design in which like reference numerals have been used for the same components.

In this case, the base layer 12 is in two parts with an injection moulded top layer 70 and a bottom capping layer 71 which form the microchannel 1 between them. A gasket 72 seals the base layer 12 to the block 13 and the two layers are bonded with an adhesive in a recess 73 and the block.

Figure 2:
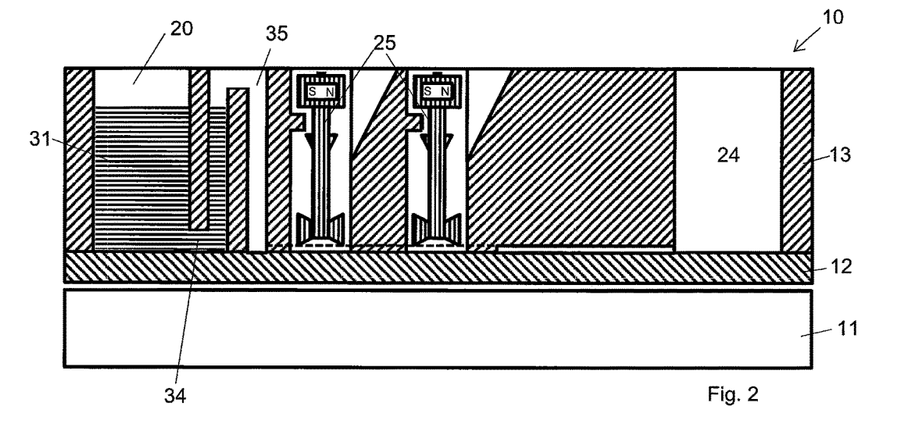
FIG. 2 is a schematic cross-section through the microfluidic device without the manifold block and the gasket showing the reservoirs in an initially filled state.
Figure 8:
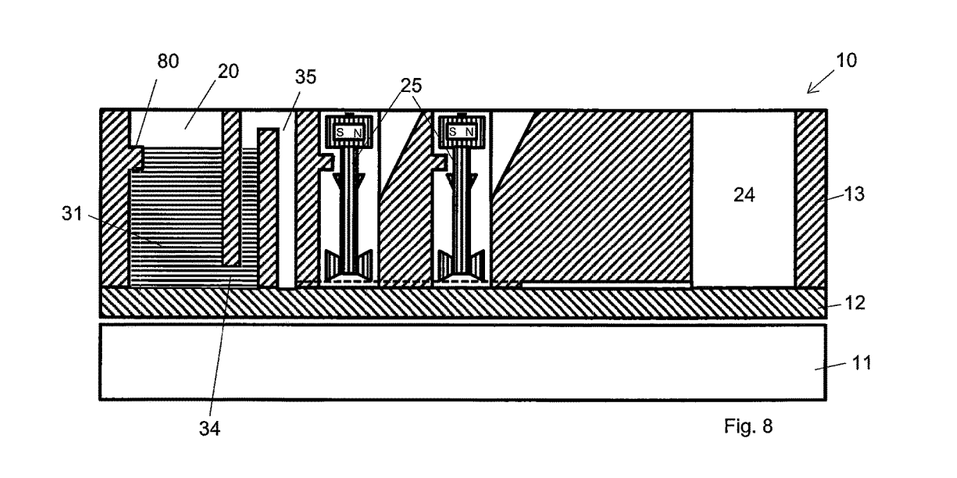
FIG. 8 is a view similar to FIG. 2 showing a fifth microfluidic device.

FIG. 8 is similar to FIG. 2 but includes a step 80 to indicate the maximum fill height to a user.

Figure 9:
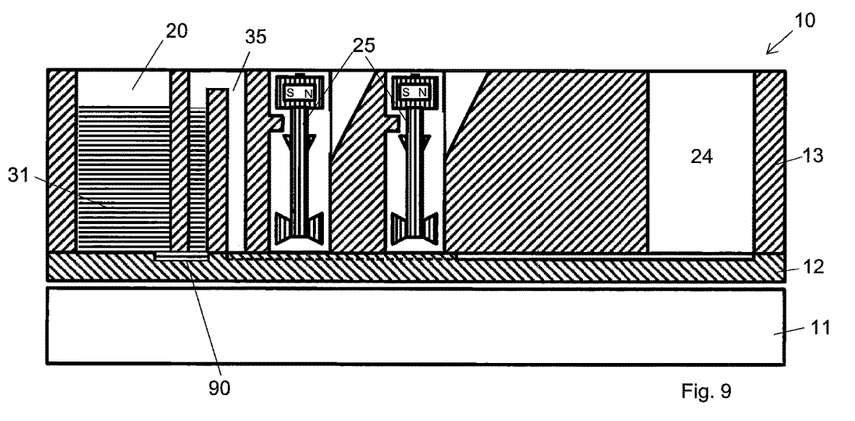
FIG. 9 is a view similar to FIG. 2 showing a sixth microfluidic device.

FIG. 9 is similar to FIG. 2. However, rather than forming the entry to the flow path 35 in the block 13, this is, instead, formed as a recess 90 in the base layer 12.

Figure 10:
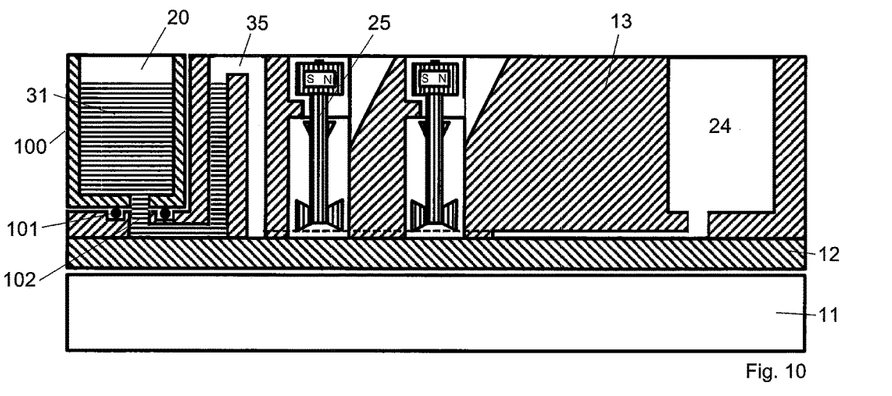
FIG. 10 is a view similar to FIG. 2 showing a seventh microfluidic device.

FIG. 10 is a view similar to FIG. 2. Rather than being formed integrally in the block 13, the reservoir is a separate component 100 which is sealed via an O-ring 101 to a channel 102 leading into the flow path 35.

The term microfluidic channel is one which is now well understood in the art. According to one definition, it can be considered as a channel with, at its narrowest part, a maximum internal dimension in a plane perpendicular to the direction of flow of 5-500 μm (preferably 5-250 μm).

The invention claimed is:
1. A microfluidic device, comprising:
 a block comprising at least one reservoir;
 a base layer attached to a bottom of the block;
 a microfluidic channel formed in the base layer or at an interface between the block and base layer, the microfluidic channel being in fluid communication with the at least one reservoir;
 a static pressure source operatively coupleable to the at least one reservoir; and
 a flow path from the at least one reservoir to the microfluidic channel, the flow path having a first portion which extends upwardly away from the base layer over a barrier and into a second portion which extends downwardly towards the base layer and leads to the microfluidic channel, the flow path being configured such that it prevents flow from the at least one reservoir to the microfluidic channel under the influence of gravity alone when, in use, the at least one reservoir is filled to a level below a level of a top of the barrier.
2. The device according to claim 1, wherein the block comprises at least one projection which forms a tortuous path from the at least one reservoir into the flow path.
3. The device according to claim 2, wherein one of the at least one projection is an upwardly extending projection which extends away from the base layer.
4. The device according to claim 1, wherein the block is injection moulded.
5. The device according to claim 1, wherein the microfluidic channel is formed in a groove in the bottom of the block, the microchannel being closed by a top surface of the base layer.
6. The device according to claim 1, wherein a lower face of the flow path is formed by a top surface of the base layer.
7. The device according to claim 1, wherein part of the flow path is formed by a gasket which seals a top of the block.
8. The device according to claim 1, wherein the at least one reservoir is formed as a bore in the block.
9. The device according to claim 1, wherein the flow path has a minimum diameter of at least 1 mm for at least a portion of its length.
10. The device according to claim 1, wherein the at least one reservoir contains an oil-based liquid.
11. The device according to claim 1, wherein the block comprises a plurality of reservoirs at least one of which has the flow path and at least one of which has an outlet at a bottom to the base layer.
12. The device according to claim 1, wherein a magnetic stirrer is rotatably suspended in the at least one reservoir, the magnetic stirrer terminating above a bottom of the at least one reservoir.
13. The device according to claim 1, further comprising a manifold block above the block, via which pressure is applied to the at least one reservoir.

* * * * *